United States Patent
Uchida et al.

(10) Patent No.: US 9,886,773 B2
(45) Date of Patent: Feb. 6, 2018

(54) OBJECT DETECTION APPARATUS AND OBJECT DETECTION METHOD

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Naohide Uchida, Numazu (JP); Noriaki Shirai, Chiryu (JP); Hirotake Ishigami, Nishio (JP)

(73) Assignees: TOYOTA JIDOSHA KABUSHIKI KAISHA, Toyota-shi, Aichi-ken (JP); DENSO CORPORATION, Kariya-shi, Aichi-ken (JP)

( * ) Notice: Subject to any disclaimer, the term of this patent is extended or adjusted under 35 U.S.C. 154(b) by 218 days.

(21) Appl. No.: 15/003,107

(22) Filed: Jan. 21, 2016

(65) Prior Publication Data
US 2016/0217583 A1 Jul. 28, 2016

(30) Foreign Application Priority Data
Jan. 23, 2015 (JP) .................................. 2015-011120

(51) Int. Cl.
| H04N 7/18 | (2006.01) |
| G06T 7/593 | (2017.01) |
| H04N 13/02 | (2006.01) |
| G06K 9/00 | (2006.01) |
| H04N 13/00 | (2006.01) |

(52) U.S. Cl.
CPC .......... *G06T 7/593* (2017.01); *G06K 9/00805* (2013.01); *H04N 13/0203* (2013.01); *G06T 2207/10021* (2013.01); *G06T 2207/30261* (2013.01); *H04N 2013/0081* (2013.01)

(58) Field of Classification Search
CPC ........... G06T 7/593; G06T 2207/30261; G06T 2207/10021; G06K 9/00805; H04N 13/0203; H04N 2013/0081
USPC ......................................................... 348/148
See application file for complete search history.

(56) References Cited

U.S. PATENT DOCUMENTS

| 2015/0092989 A1* | 4/2015 | Kasaoki ............. G06K 9/00805 382/104 |
| 2016/0148514 A1* | 5/2016 | Iwami .................... G08G 1/168 340/932.2 |

FOREIGN PATENT DOCUMENTS

JP 2009-176091 A 8/2009

* cited by examiner

*Primary Examiner* — Allen Wong
(74) *Attorney, Agent, or Firm* — Sughrue Mion, PLLC

(57) ABSTRACT

An object detection apparatus includes a camera and an ECU. The camera is mounted to a vehicle and captures an image. The ECU is configured to obtain a depth distance for each pixel area of the image based on the image; extract at least one potential object based on the depth distance; calculate an amount of change over time in the depth distance of the at least one potential object; and detect an object around the vehicle from among the at least one potential object using the amount of change over time. When a first potential object and a second potential object that are adjacent in the image are extracted, and a second amount of change over time is twice a first amount of change over time, the second potential object is determined to be the same object as the first potential object.

3 Claims, 5 Drawing Sheets

OBJECT DETECTION APPARATUS AND OBJECT DETECTION METHOD

INCORPORATION BY REFERENCE

The disclosure of Japanese Patent Application No. 2015-011120 filed on Jan. 23, 2015 including the specification, drawings and abstract is incorporated herein by reference in its entirety.

BACKGROUND OF THE INVENTION

1. Field of the Invention

The invention relates to an object detection apparatus and an object detection method.

2. Description of Related Art

As technology related to object detection, Japanese Patent Application Publication No. 2009-176091 (JP 2009-176091 A), for example, describes technology that detects an object in the vicinity using an image captured by a camera. JP 2009-176091 A describes an apparatus and method that obtains distance information on the image, and detects an object based on that distance information. This detection apparatus and detection method attempts to inhibit erroneous detection due to a reflection of a host vehicle by excluding an area between tail lamps of a leading vehicle from the target distance information to be obtained, when applied to the detection of a leading vehicle traveling ahead of the host vehicle.

SUMMARY OF THE INVENTION

The object detection technology described above may not be able to sufficiently inhibit erroneous detection of an object. That is, because only a specific area is omitted as a target for which distance information is to be obtained, a reflection of the host vehicle in other areas may not be able to be managed, resulting in a situation in which erroneous detection of an object occurs.

Therefore, there is a need to develop object detection technology in which erroneous detection of an object is inhibited, in this technical field.

Thus, one aspect of the invention relates to an object detection apparatus that includes a camera and an ECU. The camera is mounted to a vehicle and captures an image. The ECU is configured to obtain a depth distance for each pixel area of the image based on the image; extract at least one potential object based on the depth distance; calculate an amount of change over time in the depth distance of the at least one potential object; and detect an object around the vehicle from among the at least one potential object using the amount of change over time. When a first potential object and a second potential object that are adjacent in the image are extracted, and a second amount of change over time is twice a first amount of change over time, the second potential object is determined to be the same object as the first potential object. The first amount of change over time is the amount of change over time in the depth distance of the first potential object, and the second amount of change over time is the amount of change over time in the depth distance of the second potential object.

According to this aspect, when detecting an object from among potential objects extracted based on the depth distance of pixel areas of an image, and a first potential object and a second potential object that are adjacent in the image are extracted, and the amount of change over time in the depth distance of the second potential object is twice the amount of change over time in the depth distance of the first potential object, the second potential object is determined to be the same object as the first potential object. Therefore, a reflection of the host vehicle, of which the amount of change over time in the depth distance is twice that of the adjacent potential object, is inhibited from being detected as a separate object.

In the aspect described above, the camera may be a stereo camera.

Another aspect of the invention relates to an object detection method that includes capturing an image with a camera, the camera being mounted to a vehicle; obtaining a depth distance for pixel area of the image based on the image, with a ECU; extracting at least one potential object based on the depth distance, with the ECU; calculating an amount of change over time in the depth distance of the at least one potential object, with the ECU; and detecting an object around the vehicle from among the at least one potential object using the amount of change over time, with the ECU. When a first potential object and a second potential object that are adjacent in the image are extracted, and a second amount of change over time is twice a first amount of change over time, the second potential object is determined to be the same object as the first potential object. The first amount of change over time is the amount of change over time in the depth distance of the first potential object, and the second amount of change over time is the amount of change over time in the depth distance of the second potential object.

According to this method, when detecting an object from among potential objects extracted based on the depth distance of pixel areas of an image, and a first potential object and a second potential object that are adjacent in the image are extracted, the second potential object is determined to be the same object as the first potential object when the amount of change over time in the depth distance of the second potential object is twice the amount of change over time in the depth distance of the first potential object. Therefore, a reflection of the host vehicle, of which the amount of change over time in the depth distance is twice that of the adjacent potential object, is inhibited from being detected as a separate object.

According to the invention, it is possible to inhibit erroneous detection of an object, in object detection using an image.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
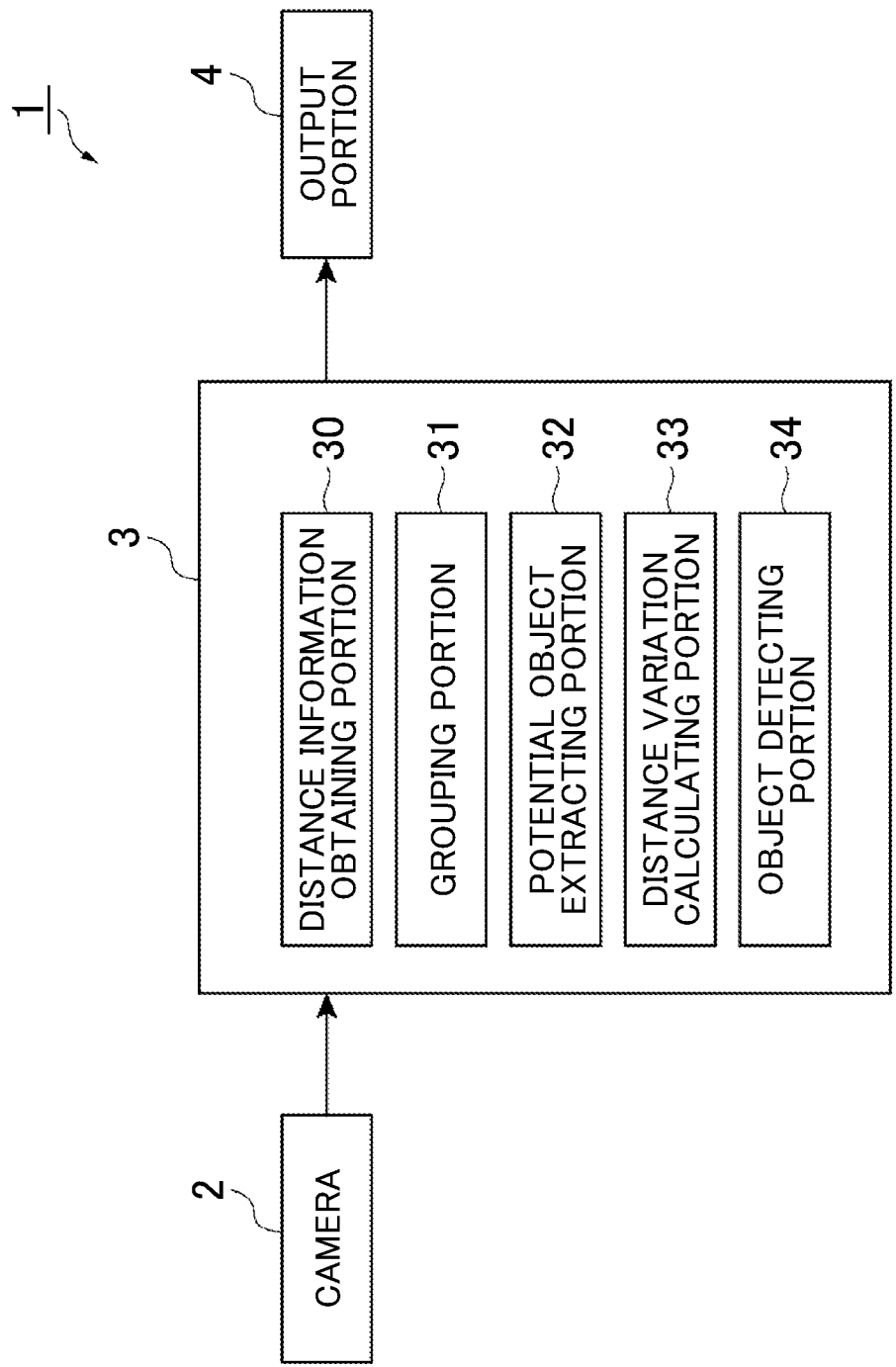
FIG. 1 is a block diagram showing an outline of the configuration of an object detection apparatus according to one example embodiment of the invention.

Hereinafter, example embodiments of the invention will be described with reference to the accompanying drawings.

In the description below, like elements will be denoted by like reference characters, and redundant descriptions will be omitted.

FIG. 1 is a general view of the structure of an object detection apparatus 1 according to one example embodiment of the invention.

As shown in FIG. 1, the object detection apparatus 1 is an apparatus that detects an object around a vehicle using an image captured by a camera 2 mounted in the vehicle. This object detection apparatus 1 is mounted in the vehicle, and includes the camera 2 and an ECU (Electronic Control Unit) 3, for example.

The camera 2 functions as an imaging portion that captures an image of an area around the vehicle, and is mounted so as to be able to capture an image of an area ahead of the vehicle in the direction of travel, for example. For the camera 2, a camera that is able to obtain brightness information of the image and depth distance information may be used. That is, a camera, such as a stereo camera, for example, that is able to obtain brightness information for each pixel area that forms the image, and depth distance information for each pixel area may be used. In this case, for the camera 2, a camera that has a plurality of imaging portions arranged lined up in a direction intersecting with the imaging direction is used. The details of the pixel area will be described later.

The image captured by the camera 2 may be color or monochrome. Also, the image waveband may be visible wavelengths or a near-infrared wavelength. That is, the image waveband may be any waveband, as long as image data from which an object around the vehicle can be recognized is able to be obtained. Also, as long as the camera is able to obtain luminance information of the image and depth distance information, a sensor other than a stereo camera, for example, a TOF (Time Off Light) camera may be used for the camera 2, or a combination of a camera that captures an image of brightness information and a sensor that obtains depth distance information, for example, a laser radar sensor or the like, may be used for the camera 2.

The ECU 3 is an electronic control unit that controls the overall object detection apparatus 1, and is mainly formed by a computer that includes a CPU, ROM, and RAM, for example. The ECU 3 is electrically connected to the camera 2, and receives an image signal from the camera 2. The ECU 3 includes a distance information obtaining portion 30, a grouping portion 31, a potential object extracting portion 32, a distance variation calculating portion 33, and an object detecting portion 34.

The distance information obtaining portion 30 is a depth distance obtaining portion that obtains information related to depth distance in the image captured by the camera 2. For example, the distance information obtaining portion 30 obtains image data captured by the camera 2, and obtains depth distance information for each pixel area that forms the image, using this image data. The image data is data from which luminance information and depth distance information for each pixel area of the image is able to be obtained, and is recorded each time it is repeatedly obtained at predetermined cycles.

A pixel area that forms the image may be an area formed by a single pixel, or an area formed by a plurality of pixels. When the pixel area is set as an area formed by a plurality of pixels, the pixel area is an area formed by four, i.e., 2×2, pixels, or an area formed by more pixels than this, for example. The brightness information is a brightness value of the pixel area, for example. When the pixel area is formed by a plurality of pixels, the average value, highest value, lowest value, or a predetermined representative value of the brightness values of a plurality of pixels may be used as the brightness information of the pixel area. Also, the depth distance information is information related to the depth distance of a captured object in the pixel area, and includes depth distance. For example, the depth distance is the distance to the captured object in the imaging direction of the camera 2. When using a stereo camera as the camera 2, the depth direction is the direction to the captured object from a straight line that connects the mounting positions of a plurality of cameras. The captured object is the object that is captured in the image, and includes background such as a road surface of a road and the sky, as well as an object such as a three-dimensional object. When the pixel area is formed by a single pixel, the depth direction of this pixel becomes the depth direction information of the pixel area. When the pixel area is formed by a plurality of pixels, the average value, highest value, lowest value, or a predetermined representative value of the depth distances of the plurality of pixels may be used as the depth distance information of the pixel area.

The value of the depth distance may be used as it is as the depth distance information, or a value corresponding to the depth distance or a value comparable to the depth distance may be used as the depth distance. For example, a value of disparity corresponding to the depth distance may be used as the depth distance information. The value of disparity is a value of disparity of a captured object or an object in two images captured by two cameras, and is a larger value the closer the depth distance is.

When a stereo camera is used as the camera 2, the distance information obtaining portion 30 generates a disparity image for two left and right images. Then the distance information obtaining portion 30 uses the value of disparity of the pixel area in the disparity image as the depth distance information. The distance information obtaining portion 30 may also calculate the depth distance for each pixel area based on the disparity of each pixel area, and use the value of this depth distance as the depth distance information. Dense stereo technology for example may be used to calculate the depth distance information. More specifically, the SGM method or the ELAS method or the like may be used as the method for calculating the depth distance information.

The grouping portion 31 groups a plurality of pixel areas based on the depth distance information, for an image for which depth distance information has been obtained. This grouping portion 31 is a portion that groups close pixel areas in a three-dimensional space into the same group. For example, when pixel areas in the same distance range are close in the vertical direction of the image, the grouping portion 31 groups these pixel areas into the same group. The same distance range is a range that includes the same distance and approximately the same distance within a predetermined distance range from the same distance. Also, when pixel areas in the same distance range are close in the vertical direction and the lateral direction of the image, the grouping portion 31 groups these pixel areas into the same group.

Figure 2:
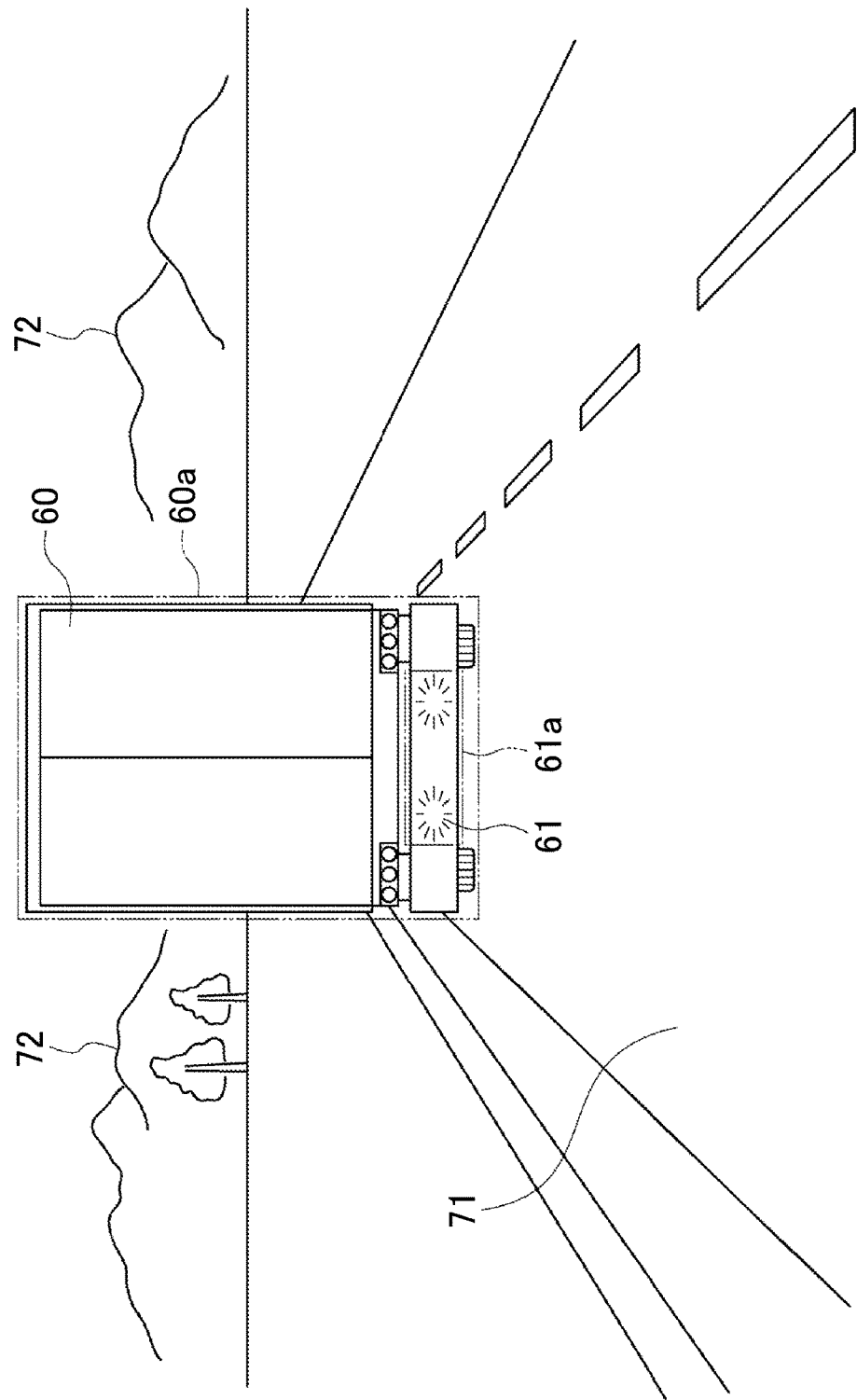
FIG. 2 is an explanatory view of an image used in object detection by the object detection apparatus in FIG. 1.

Grouping in the grouping portion 31 will now be described in detail with reference to FIGS. 2 to 4. FIG. 2 is a view of an image in the advancing direction of a host vehicle captured by the camera 2. A leading vehicle 60 is captured in this image. A reflection area 61 of the host vehicle is present on a lower portion of the leading vehicle 60. FIG. 2 is a view of an example of a reflection from headlights of the host vehicle at night.

When grouping is performed on the image in FIG. 2 by the grouping portion 31, pixel areas in the same distance range are grouped into the same group whey they are close in a predetermined distance range. In FIG. 2, the leading vehicle 60 is grouped together as a first group 60a, and the reflection area 61 of the host vehicle is grouped together as a second group 61a. This is because the depth distance of the reflection area 61 is twice the depth distance of the leading vehicle 60, so it is recognized as a different group.

Figure 3:
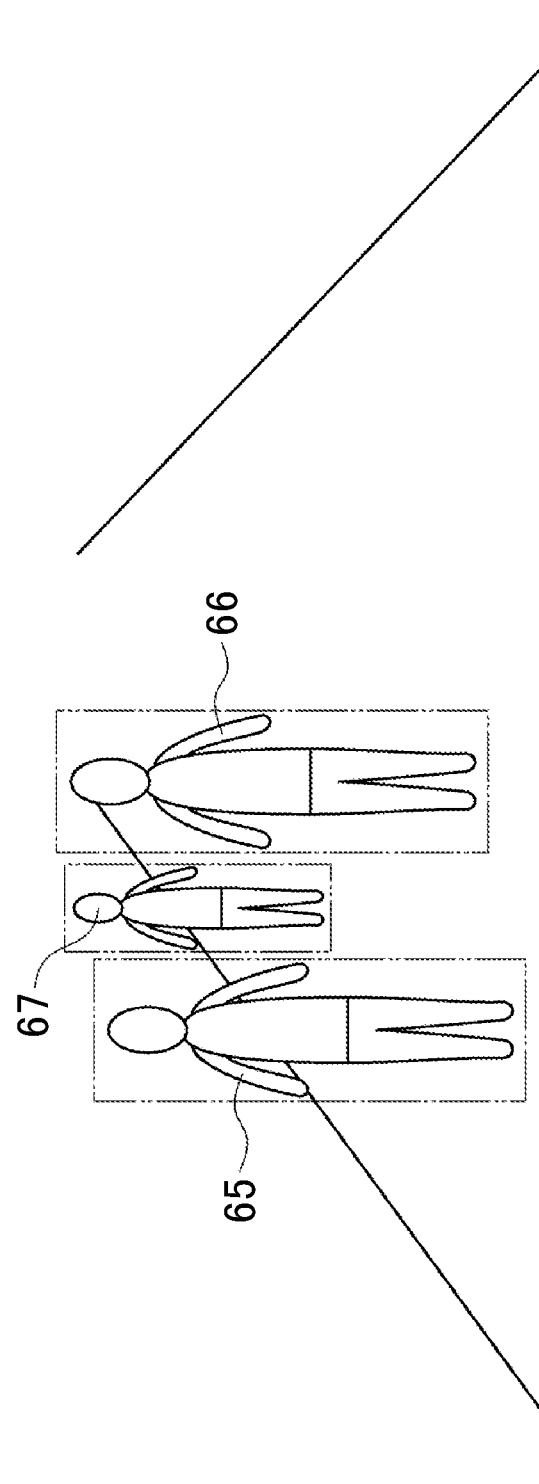
FIG. 3 is an explanatory view of grouping in the object detection apparatus in FIG. 1.

FIG. 3 is a view of an image in the advancing direction of the host vehicle captured by the camera 2, in which pedestrians 65, 66, and 67 are captured. The pedestrians 65 and 66 are at the same depth distance, and the pedestrian 67 is farther away than the pedestrians 65 and 66, and is shown between the pedestrian 65 and the pedestrian 66. In this case, the pedestrians 65, 66, and 67 are grouped according to their depth distances. That is, the pedestrians 65 and 66 are in different groups because the pedestrian 67 that is at a different depth distance is shown between them.

Figure 4:
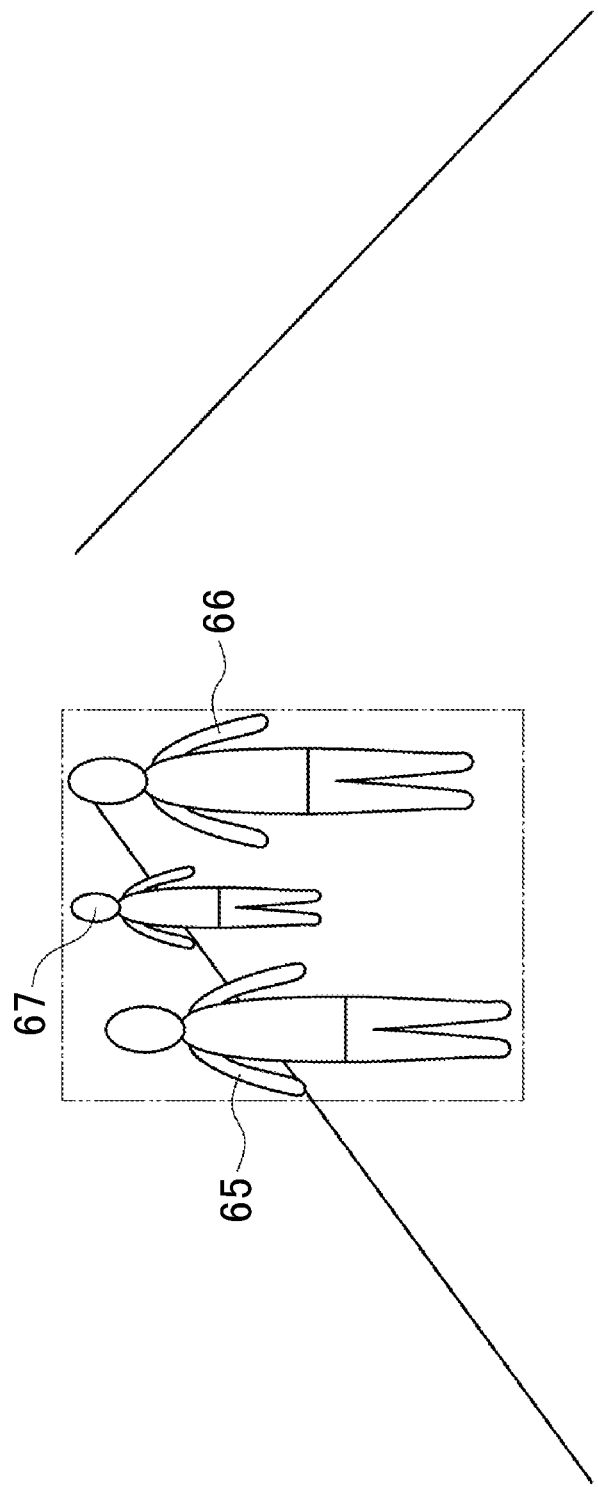
FIG. 4 is a view of a comparative example of grouping in object detection.

In contrast, the comparative example shown in FIG. 4 is an example in which grouping is performed without sufficient consideration given to depth distance. In this comparative example, the pedestrians 65, 66, and 67 are grouped in the same group, so appropriate grouping is not performed.

Also, in the grouping by the grouping portion 31, data of a bird's eye view with a coordinate system of a lateral position and a depth position of objects in an image may be created, the presence of the objects may be recognized, and they may be grouped. Also, as the information of the lateral position of an object, a brightness value of the image area may be used, or an optical flow of each image area in order to recognize a change over time in a group may be used.

The potential object extracting portion 32 is an extracting portion that extracts (i.e., selects) a potential object based on the depth distance obtained by the distance information obtaining portion 30. That is, a potential object to be detected from objects shown in an image is extracted using the depth distance information. For example, A three-dimensional object such as the leading vehicle 60, a road surface 71, and a background 72 are all shown in the image in FIG. 2, and are grouped according to their respective depth distances, but only the three-dimensional object is extracted as a potential object.

More specifically, the depth distance of the background 72 is large, so the background 72 is able to be excluded as a potential object by limiting potential objects to those objects having a depth distance of equal to or less than a predetermined threshold value. Also, the road surface 71 is an area where the depth distance gradually changes according to the displayed position, so the road surface 71 is able to be excluded as a potential object by limiting potential objects to those objects having a depth distance that does not change equal to or more than a predetermined amount. Also, in addition to the road surface 71, a wall or a guardrail or the like provided along the road may also be excluded as a potential object. As a result, a three-dimensional object around the host vehicle will be extracted as a potential object.

The distance variation calculating portion 33 is a calculating portion that calculates a change over time in the depth distance of a potential object extracted by the potential object extracting portion 32. For example, in FIG. 2, if the first group 60a indicative of the leading vehicle 60 and the second group 61a that is in the reflection area 61 of the host vehicle are extracted as potential objects, the amount of change over time in the depth distance is calculated for each of the first group 60a and the second group 61a are calculated. The amount of change over time in the depth distance of the potential objects corresponds to the relative speeds of the potential objects with respect to the object detection apparatus 1 or the host vehicle. The specific calculations of the amount of change over time in the depth distances are performed based on the most recent depth distances and the current depth distances of the first group 60a and the second group 61a, in the object detecting process that is performed repeatedly. The depth distance of each group may be calculated based on a representative value such as an average value or the median value of the pixel area that form the group. The amount of change over time in the depth distance may also be calculated using the next to most recent depth distance or a depth distance before that.

The object detecting portion 34 is a detecting portion that detects an object from amount the potential objects using the amount of change over time in the depth distance of the potential objects calculated by the distance variation calculating portion 33. That is, when a first potential object and a second potential that are adjacent in the image are extracted by the potential object extracting portion 32, the object detecting portion 34 determines that the second potential object is the same object as the first potential object when the amount of change over time in the depth distance of the second potential object is twice the amount of change over time in the first potential object. However, if the first potential object and the second potential object that are adjacent in the image are extracted and the amount of change over time in the depth distance of the second potential object is not twice the amount of change over time in the first potential object, then the object detecting portion 34 determines that the second potential object is a different object than the first potential object. Also, if potential objects that are adjacent in the image are not extracted, the object detecting portion 34 determines that non-adjacent potential objects are separate objects.

More specifically, in FIG. 2, if the first group 60a of the leading vehicle 60 and the second group 61a of the reflection area 61 of the host vehicle are extracted as potential objects while adjacent to one another, it is determined whether the amount of change over time in the depth distance of one of the first group 60a of the leading vehicle 60 and the second group 61a of the reflection area 61 is twice the amount of change over time of the other. Then, if the amount of change over time in the depth distance of the second group 61a of the reflection area 61 is twice the amount of change over time in the depth distance of the first group 60a of the leading vehicle 60, for example, the second group 61a is determined or recognized to be the same object as the leading vehicle 60 of the first group 60a.

Therefore, the headlights of the host vehicle or the like reflected on the leading vehicle 60 are recognized as part of the leading vehicle 60, so the reflection of the headlights or the like is inhibited from being erroneously detected as a separate object from the leading vehicle 60.

Here, twice the amount of change over time in the depth distance also includes approximately twice the amount of change over time. For example, taking detection error of the depth distance into account, the second potential object may be determined to be the same object as the first potential object when the amount of change over time in the depth distance of the second potential object is approximately twice the amount of change over time in the first potential object. More specifically, if the detection accuracy of the depth distance is ±10% of the actual distance, the second potential object may be detected as the same object as the first potential object when the amount of change over time in the depth distance of the second potential object is a value within ±20% of twice the amount of change over time in the first potential object. Also, the range of approximately twice may be set according to the detection accuracy of the depth distance.

Also, when the first potential object and the second potential object are adjacent may be when one side of each of the first potential object and the second depth distance are in contact with each other, or when the second group 61a that is the second potential object is surrounded by, and contacting, the first group 60a that is the first potential object as in FIG. 2.

On the other hand, if the reflection area 61 of the host vehicle is not present on the leading vehicle 60, i.e., if there is no adjacent potential object, in FIG. 2, the first group 60a of the leading vehicle 60 is detected as an object without using the amount of change over time in the depth distance.

The distance information obtaining portion 30, the grouping portion 31, the potential object extracting portion 32, the distance variation calculating portion 33, and the object detecting portion 34 described above may be formed by installing software or a program that will realize the respective functions into the ECU 3. Also, a portion or all of these may be formed by a single electronic control unit.

In FIG. 1, an output portion 4 is electrically connected to the ECU 3. The output portion 4 is operated based on the detection results of the object. For example, a notification device that notifies a driver, or a control device that controls driving or the like corresponds to the output portion.

Next, operation of the object detection apparatus 1 according to this example embodiment and an object detection method according to this example embodiment will be described.

Figure 5:
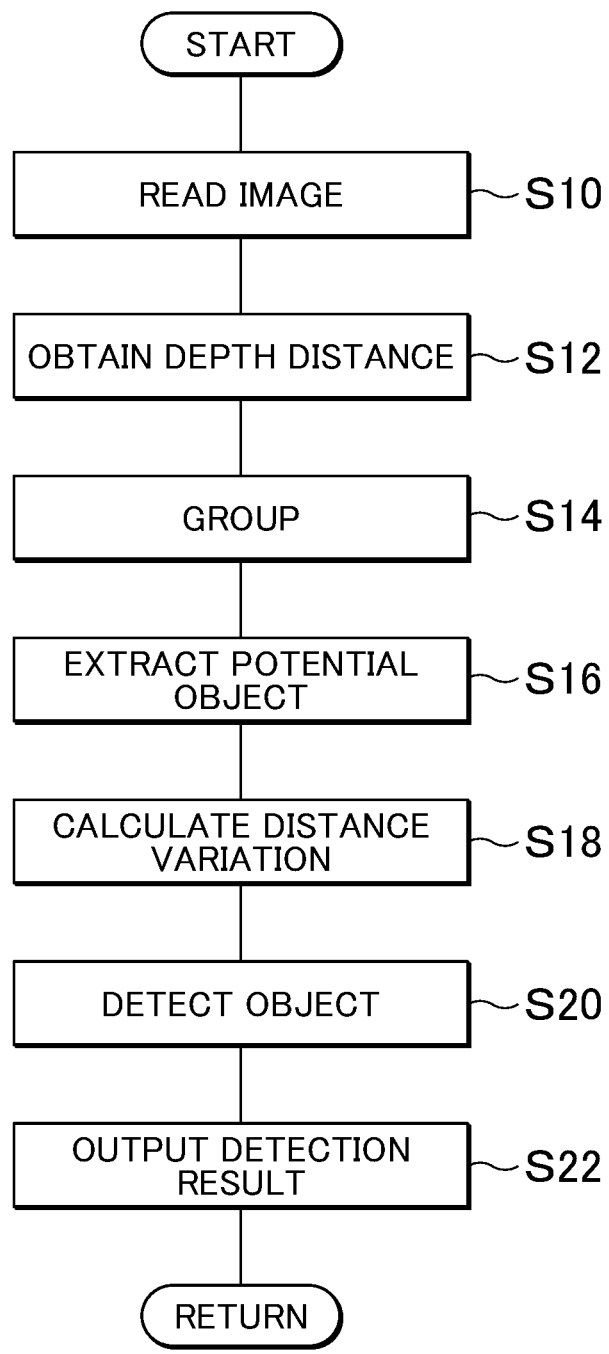
FIG. 5 is a flowchart illustrating operation of the object detection apparatus in FIG. 1 and an object detection method according to the example embodiment.

FIG. 5 is a flowchart illustrating an object detection routine of the object detection apparatus 1 and the object detection method according to this example embodiment. The object detection routine is repeatedly executed by the ECU 3 at predetermined cycles, for example.

As shown in step S10 of FIG. 5, first, an image reading process is performed. An image reading process is a process for reading image data of an image captured by the camera 2. When a stereo camera is used as the camera 2, a plurality of image datum are read.

Then the process proceeds on to step S12 where a distance information obtaining process is performed. This distance information obtaining process is a process for obtaining information regarding depth distance in the image captured by the camera 2. That is, in this distance information obtaining process, depth distance information is obtained for each pixel area that makes up the image, using the image data. The depth distance information obtained by this distance information obtaining process is repeatedly obtained at predetermined cycles, and is stored each time it is obtained. As the specific content of this process, a process for generating a disparity image for two left and right images is performed when a stereo camera is used as the camera 2, for example. A value of the disparity of each pixel area of the disparity images is obtained as depth distance information. Also, the depth distance of each image area may be calculated based on the disparity of each image area, and the value of that depth distance may be obtained as the depth distance information.

Then the process proceeds on to step S14 where a grouping process is performed. The grouping process is a process for linking a plurality of pixel areas and grouping them together based on the depth distance information, for an image for which the depth distance information has been obtained. In this grouping process, pixel areas that are close in a three-dimensional space are grouped together in the same group. For example, when pixel areas in the same distance range on an image are close within a predetermined distance range, they are grouped together in the same group.

For example, in FIG. 2, the leading vehicle 60 is grouped in the first group 60a. Also, the reflection area 61 of the host vehicle on the leading vehicle 60 is grouped in the second group 61a. This is because the reflection area 61 is at a depth distance twice that of the leading vehicle 60, so it is recognized as a separate group based on the depth distance.

In this grouping process, grouping may be performed by performing a voting process by dividing the image into a plurality of areas, or a format in which grouping is performed by selecting a plurality of individual representative distances from a histogram may be used. Also, either method may be used as long as the pixel areas of the same distance range in the image are able to be grouped together. The result of the grouping process is then recorded and retained. For example, at least a position in the image, the size of the area, and the depth distance of a grouped group are linked together and recorded.

Then the process proceeds on to step S16 in FIG. 5, where a potential object extraction process is performed. The potential object extraction process is a process for extracting a potential object based on the depth distance obtained by the distance information obtaining process. That is, the potential object to be detected from among those objects displayed on the image is extracted using the depth distance information. For example, a three-dimensional object such as the leading vehicle 60, the road surface 71, and the background 72 are all displayed in the image of FIG. 2, and are grouped according to their respective depth distances, but only the three-dimensional object is extracted as a potential object.

More specifically, the depth distance of the background 72 is large, so the background 72 is able to be excluded as a potential object by limiting potential objects to those objects having a depth distance of equal to or less than a predetermined threshold value. Also, the road surface 71 is an area where the depth distance gradually changes according to the displayed position, so the road surface 71 is able to be excluded as a potential object by limiting potential objects to those objects having a depth distance that does not change equal to or more than a predetermined amount. Also, in addition to the road surface 71, a wall or a guardrail or the like provided along the road may also be excluded as a potential object. As a result, a three-dimensional object around the host vehicle will be extracted as a potential object.

Then the process proceeds on to step S18 where a distance variation calculation process is performed. This distance variation calculation process is a process for calculating the amount of change over time in the depth distance of the potential object extracted by the potential object extraction process. For example, in FIG. 2, if the first group 60a indicative of the leading vehicle 60, and the second group 61a that is the reflection area 61 of the host vehicle are extracted as potential objects, then the amount of change over time in the depth distance is calculated for both the first group 60a and the second group 61a. More specifically, the amounts of change over time in the depth distances need simply be calculated based on the most recent depth distances and the current depth distances of the first group 60a and the second group 61a. The amount of change over time in the depth distance may also be calculated using the next to most recent depth distance or a depth distance before that.

Then the process proceeds on to step S20 where an object detection process is performed. This object detection process is a process for detecting an object from among potential objects using the amount of change over time in the depth distance of potential objects calculated by the distance variation calculation process. That is, in the object detection process, when a first potential object and a second potential that are adjacent in the image are extracted by the potential object extraction process, the second potential object is determined to be the same object as the first potential object when the amount of change over time in the depth distance of the second potential object is twice the amount of change over time in the first potential object. However, in the object detection process, if the first potential object and the second potential object that are adjacent in the image are extracted and the amount of change over time in the depth distance of the second potential object is not twice the amount of change over time in the first potential object, then the second potential object is determined to be a different object than the first potential object. Also, in the object detection process, if potential objects that are adjacent in the image are not extracted, non-adjacent potential objects are determined to be separate objects.

More specifically, in FIG. 2, if the first group 60a of the leading vehicle 60 and the second group 61a of the reflection area 61 of the host vehicle are extracted as potential objects while adjacent to one another, it is determined whether the amount of change over time in the depth distance of one of the first group 60a of the leading vehicle 60 and the second group 61a of the reflection area 61 is twice the amount of change over time of the other. Then, if the amount of change over time in the depth distance of the second group 61a of the reflection area 61 is twice the amount of change over time in the depth distance of the first group 60a of the leading vehicle 60, for example, the second group 61a is determined or recognized to be the same object as the leading vehicle 60 of the first group 60a. Therefore, the headlights of the host vehicle or the like reflected on the leading vehicle 60 are recognized as part of the leading vehicle 60, so the reflection of the headlights or the like is inhibited from being erroneously detected as a separate object from the leading vehicle 60. However, if there is no reflection area 61 on the leading vehicle 60 in FIG. 2, i.e., if there are no adjacent potential objects, the first group 60a of the leading vehicle 60 is detected as an object without using the amount of change over time in the depth distance.

Then the process proceeds on to step S22 in FIG. 5, where an output process is performed. The output process is a process for outputting the detection result of the object. For example, the detection result of the object is output to the output portion 4 such as a notification device that notifies the driver, or a control device that controls driving. When the process in step S22 is complete, this cycle of the control routine ends.

In the cycle of the control routine in FIG. 5, as long as the control result is unaffected, the order of the control processes may be interchanged, or execution of a portion of the control processes may be omitted.

As described above, according to the object detection apparatus 1 and the object detection method according to this example embodiment, when detecting an object from among potential objects extracted based on the depth distance of pixel areas of an image, and a first potential object and a second potential object that are adjacent in the image are extracted, the second potential object is determined to be the same object as the first potential object when the amount of change over time in the depth distance of the second potential object is twice the amount of change over time in the depth distance of the first potential object. Therefore, a reflection of the host vehicle, of which the amount of change over time in the depth distance is twice that of the adjacent potential object, is inhibited from being detected as a separate object, so the object detection accuracy improves.

Also, with the object detection apparatus 1 and the object detection method according to this example embodiment, as long as the first potential object and the second potential object are adjacent, a reflection of the host vehicle is able to be inhibited from being erroneously detected as a separate object, even if there is no specific positional relationship. For example, with an apparatus that excludes only an area between tail lamps of a leading vehicle as a target for which distance information is to be obtained, when the road on which the host vehicle is traveling is uphill, the position of the reflection of the host vehicle will be a position lower than between the tail lamps, so erroneous detection is unable to be suitably inhibited. In contrast, with the object detection apparatus 1 and the object detection method according to this example embodiment, even if the area of the reflection of the host vehicle is offset from a position between the tail lamps, the leading vehicle and the area of the reflection of the host vehicle are adjacent, so erroneous detection is able to be inhibited.

Also, with the object detection apparatus 1 and the object detection method according to this example embodiment, as long as the first potential object and the second potential object are adjacent, it is possible to inhibit the reflection of the host vehicle from being erroneously detected as a separate object not only at night but also during the day. For example, with an apparatus that excludes only an area between the tail lamps of a leading vehicle as a target for which distance information is to be obtained, the tail lamps are unable to be easily detected unless it is at night, so detection except for at night is difficult. In contrast, with the object detection apparatus 1 and the object detection method according to this example embodiment, detection of the tail lamps is unnecessary, so the load on the object detection process is reduced, and object detection is not difficult even with object detection during the day.

The example embodiment above describes one example embodiment of the object detection apparatus according to the invention, but the object detection apparatus according to the invention is not limited to that described in the example embodiment. The object detection apparatus according to the invention may be modified from the object detection apparatus according to the example embodiment described above without departing from the scope of the claims, or may applied to something other than a vehicle.

What is claimed is:

1. An object detection apparatus comprising:
   a camera that is mounted to a vehicle and captures an image;
   an ECU configured to
      obtain a depth distance for each pixel area of the image based on the image;
      extract at least one potential object based on the depth distance;
      calculate an amount of change over time in the depth distance of the at least one potential object; and
      detect an object around the vehicle from among the at least one potential object using the amount of change over time;
   wherein when a first potential object and a second potential object that are adjacent in the image are extracted, and a second amount of change over time is twice a first amount of change over time, the second potential object is determined to be the same object as the first potential object, the first amount of change over time being the amount of change over time in the depth distance of the first potential object, and the second amount of change over time being the amount of change over time in the depth distance of the second potential object.

2. The object detection apparatus according to claim 1, wherein
the camera is a stereo camera.

3. An object detection method comprising:
capturing an image with a camera, the camera being mounted to a vehicle;
obtaining a depth distance for pixel area of the image based on the image, with a ECU;
extracting at least one potential object based on the depth distance, with the ECU;
calculating an amount of change over time in the depth distance of the at least one potential object, with the ECU; and
detecting an object around the vehicle from among the at least one potential object using the amount of change over time, with the ECU;
wherein when a first potential object and a second potential object that are adjacent in the image are extracted, and a second amount of change over time is twice a first amount of change over time, the second potential object is determined to be the same object as the first potential object, the first amount of change over time being the amount of change over time in the depth distance of the first potential object, and the second amount of change over time being the amount of change over time in the depth distance of the second potential object.

* * * * *